OR  3,529,883
× 3054 W
Sept. 22, 1970   R. F. WUERKER ET AL   3,529,883
PULSED LASER HOLOCAMERA
Filed Nov. 7, 1968   2 Sheets-Sheet 1
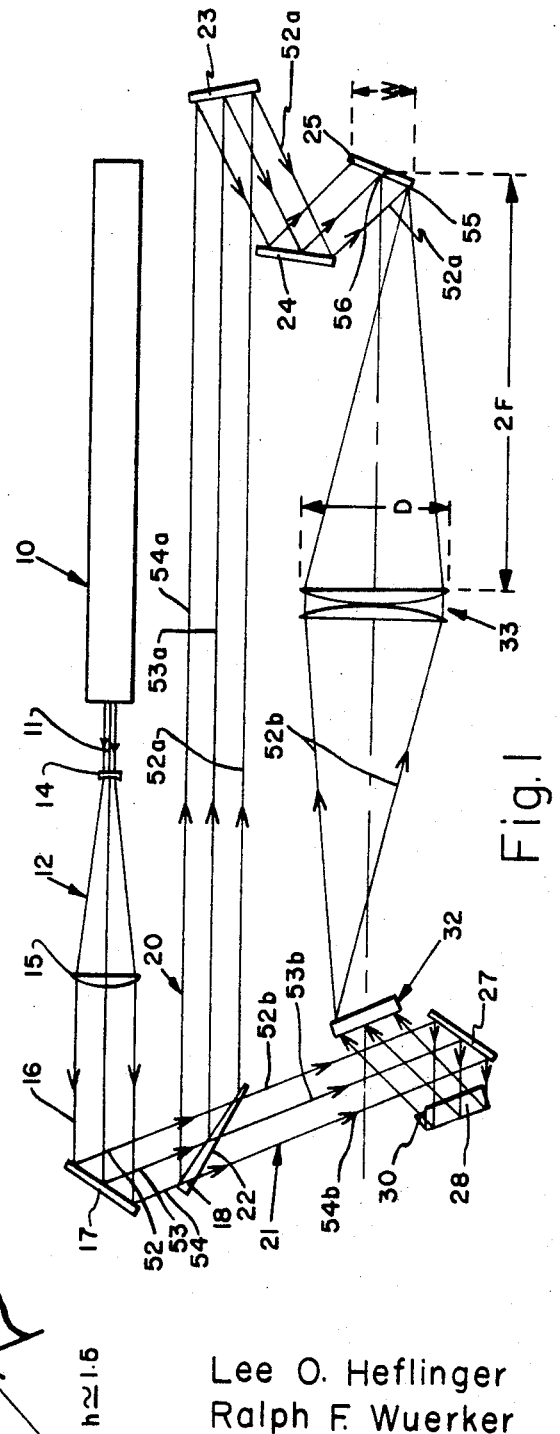
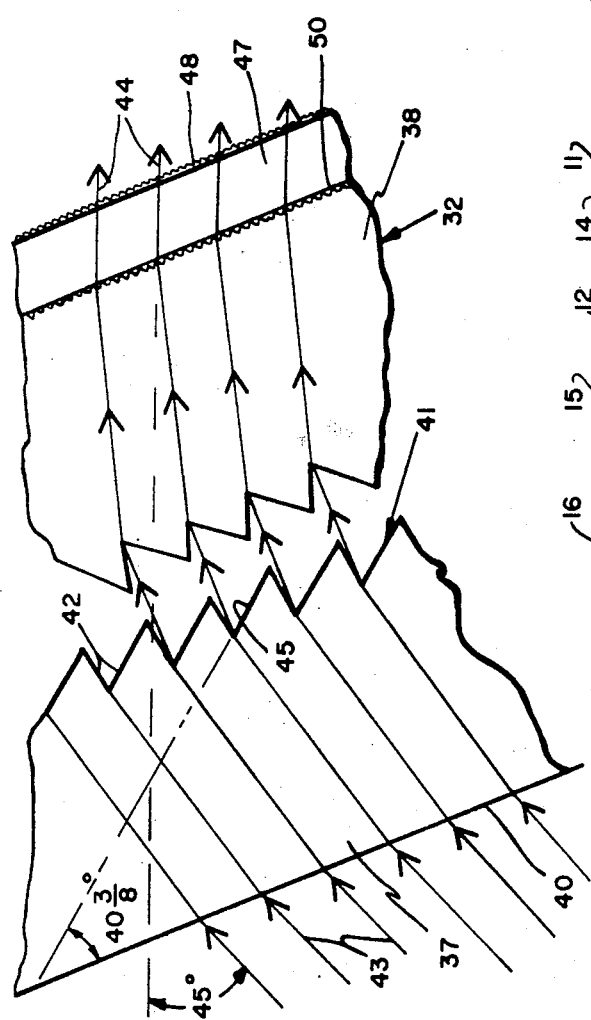
Lee O. Heflinger
Ralph F. Wuerker
INVENTORS
BY Edwin A. Oha.
ATTORNEY Lee O. Heflinger
Ralph F. Wuerker
INVENTORS

United States Patent Office 3,529,883
Patented Sept. 22, 1970

3,529,883
PULSED LASER HOLOCAMERA
Ralph F. Wuerker, Palos Verdes Estates, and Lee O. Helflinger, Torrance, Calif., assignors to TRW Inc., Redondo Beach, Calif., a corporation of Ohio
Filed Nov. 7, 1968, Ser. No. 774,019
Int. Cl. G02b 27/00
U.S. Cl. 350—3.5      8 Claims

ABSTRACT OF THE DISCLOSURE

A holographic apparatus for recording transmission holograms of relatively large objects. The apparatus provides both temporal and spatial coherence matching and is capable of utilizing a laser such as a pulsed ruby laser having relatively low coherence. The reference beam and the scene beam are arranged substantially parallel to each other and parallel to the beam developed by the laser. The reference beam includes a roof reflector for inverting the beam as well as a special optical element for bending the scene beam and properly increasing the optical path transversely across it. Both the reference beam and the scene beam are obtained after expanding and collimating the light beam from the laser. A large inverting lens is used so that the beam bender and the hologram are at conjugate positions. Preferably the hologram is inclined at an angle such that a line perpendicular to the hologram bisects the angle between the reference beam and the scene beam, which may be of the order of 45°.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates generally to holography and particularly relates to a holographic apparatus for recording holograms of a relatively large object in transmission.

In order to obtain holograms of good quality it is conventional practice to utilize a reference beam and a scene beam having high temporal and spatial coherence. Temporal coherence has to do with the actual path difference of the two beams. Spatial coherence has to do with the ability of the two beams to interfere over their entire cross section, where they intersect. Good temporal and spatial coherence may generally be obtained by utilizing a gas laser such as a helium neon laser. These lasers have temporal coherence of the order of fractions of a meter or even larger. They can be completely spatially coherent. However, such good coherence lasers are of milliwatt intensities and cannot be used to record anything but static scenes. Solid state lasers such as a ruby laser do not provide good coherence. On the other hand, they are useful because they have a higher light output than a gaseous helium neon laser, for example. For the investigation of many action phenomena, pulsed lasers are necessary. This includes any phenomena which are characterized by rapid movements such as rocket exhausts and the like. In that case a pulsed ruby laser is almost necessary because this is the only light source providing high-intensity, short-duration light pulses.

Accordingly both for the sake of economy and for the sake of light intensity, it is highly desirable to be able to use solid state lasers having inherently relatively low coherence.

It is accordingly an object of the present invention to provide holographic apparatus providing both temporal and spatial coherence even with a laser having a short coherence length.

Another object of the present invention is to provide holographic apparatus of the type described which enables the recording of holograms of relatively large action objects in transmission.

A further object of the present invention is to provide holographic apparatus capable of utilizing a laser having a relatively short coherence path and which may be used for taking holograms and holographic interferograms in transmission of such phenomena as may occur in wind tunnels or rocket exhausts.

SUMMARY OF THE INVENTION

A holographic apparatus in accordance with the present invention serves the purpose of recording holograms in transmission of relatively large objects. In particular the apparatus provides both temporal and spatial coherence matching. It uses a laser for providing a coherent, substantially monochromatic light beam. As pointed out before, the laser may, for example, consist of a ruby laser which may be pulsed or Q-switched for taking action holograms. The light beam which issues from the laser is expanded and collimated by suitable optical means such as a beam expanding telescope.

The collimated beam is then split by a beam splitter into a reference and a scene beam. The reference beam is directed in a direction substantially parallel to that of the light beam issuing from the laser. A photosensitive material, such as a photographic plate, film or the like is disposed in a predetermined plane for recording the hologram.

The reference beam is now reflected onto the photosensitive material, for example, by mirrors. Furthermore, optical means are provided for inverting the scene beam and for projecting it substantially parallel to the reference beam onto the photosensitive material. This may include a beam bender as well as a light diffuser. Finally an inverting lens is disposed in the scene beam between the beam bender and the photosensitive material for inverting the scene beam once more and for illuminating a relatively large space between the lens and the photosensitive material. This will permit to record a hologram in transmission in this space. The arrangement is such as to provide both spatial and temporal coherence of reference and scene beams when they meet at the photosensitive material.

The foregoing and other objects of the present invention will become more apparent and better understood when taken in conjunction with the following description and accompanying drawings, throughout which like characters indicate like parts and which drawings form a part of this application.

BRIEF DESCRIPTION OF THE DRAWINGS

FIG. 1 is a schematic, side elevational view of a holographic apparatus in accordance with the present invention;

FIG. 2 is a sectional view, on enlarged scale, of a beam bender and light diffuser forming part of the apparatus of FIG. 1.

DESCRIPTION OF THE PREFERRED EMBODIMENT

Figure 3:
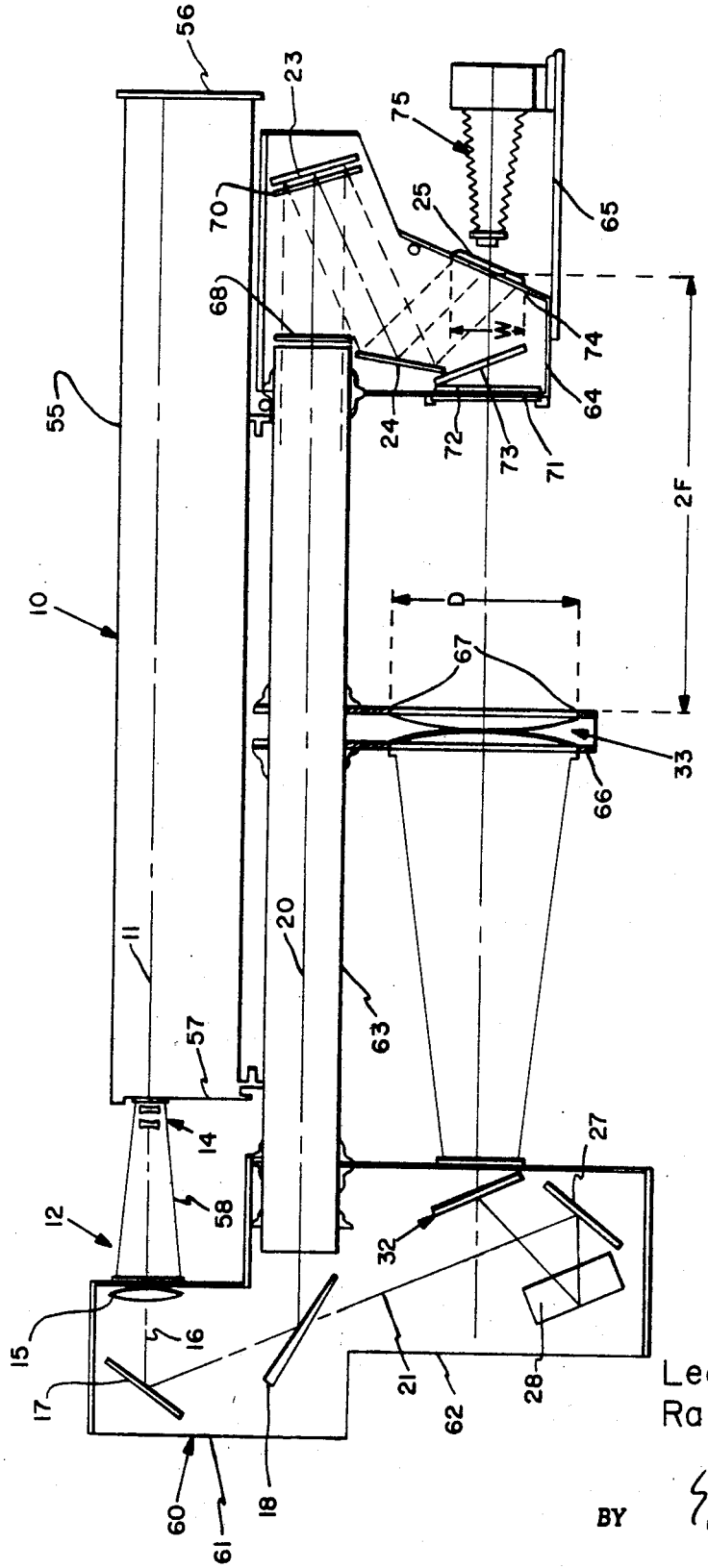
FIG. 3 is a side elevational view, partly in section, of holographic apparatus embodying the present invention.

Referring now to the drawings and particularly to FIGS. 1 and 2, there is illustrated a holographic apparatus for recording holograms in transmission. The apparatus of FIG. 1 includes a laser schematically indicated at 10. This can be an inexpensive laser such as a solid laser which may utilize a ruby rod. If holograms of very rapidly moving phenomena are required, a conventional Q-switched attachment may be added. Such a pulsed laser will have a pulse duration on the order of 30 to 100 nanoseconds.

The temporal coherence of a Q-switched ruby laser may be low, of the order of 1 millimeter to 1 centimeter. The coherence length depends on the quality of the ruby rod, its configuration, the level of pumping and other factors.

It is one of the advantages of the present invention that it makes it possible to utilize a relatively inexpensive laser with a relatively short coherence length. The reason for that is that the holographic apparatus of the present invention provides careful temporal and spatial matching. This will be more fully explained hereinafter. It should be noted at this time that temporal matching means that the path length of the scene beam and of the reference beam are identical. Spatial matching means that the scene beam and the reference beam at the hologram are exactly overlapped or matched in space.

The laser 10 issues in a conventional manner a collimated, relatively narrow-diameter light beam 11. This light beam is now preferably expanded and collimated by a suitable lens system 12. This may be represented, for example, by a Galilean telescope having a diverging lens 14 and a collimating lens 15 as shown. As a result a light beam 16 emerges which is larger in diameter and is again collimated.

This light beam is now reflected by a reflecting mirror 17, which reflects the light beam 16 downwardly onto a beam splitter 18. The beam splitter provides a reference beam 20 and a scene beam 21. The reference beam 20 is directed in a direction parallel to that of the original laser beam 11. This arrangement saves space and permits a holographic apparatus which may be readily moved, for example, on braced feet. The beam splitter 18 preferably consists of a wedge-shaped glass plate so that the undesired reflection from the rear surface 22 of the glass plate is directed away from the direction of the reference beam 20.

The reference beam 20 is now again reflected twice by two reflecting mirrors 23 and 24 so that it is directed toward a plane 25 where a suitable recording material is provided. This may, for example, consist of a photographic plate, a film or some other photosensitive material for recording a hologram. As will be more fully explained hereinafter, the angle of the photosensitive material 25 with the scene beam and the angle at which the reference beam 20 intersects the scene beam 21 at the plane 25, are preferably such as to minimize distortion of the fringes (due to the interference of scene and reference beams) in the photographic emulsion of the plate 25. This is also determined by the resolution of the photographic material. The 45° scene reference beam angle is dictated by resolution of intermediate resolving holographic emulsion such as Type 10E75 manufactured by Agfa Gevaert.

The scene beam 21 is also reflected once again by a reflecting mirror 27. The beam is then reflected by a so-called roof reflector consisting of two front-reflecting mirrors 28 and 30, forming an angle of 90° with each other. The roof reflector 28, 30 serves the purpose to reverse the beam. The optical component generally indicated at 32 provides a beam bender which is shown in detail in FIG. 2 and which serves the purpose to bend the scene beam through 45° without inverting it. The angle of the beam bender relative to the axis of the intermediate lenses 33 is the same as the angle of the holographic plate. The scene beam strikes the beam bender 32 at the same angle that the reference beam 20 strikes the holographic plate. As a result of this specific arrangement the optical path of any scene-reference ray starting at the beam splitter 18 is the same. Consequently, scene and reference beams are temporally matched everywhere across the holographic plate. The beam bender 32 may additionally include a diffuser as will be presently explained in connection with FIG. 2.

In any case, the scene beam emerges from the beam bender 32 in a direction substantially parallel to that of the reference beam 20.

An inverting and focusing lens system 33 is disposed between the beam bender 32 and the photographic plate 25. The focusing and inverting lens system 33 may, for example, consist of two planoconvex lenses as shown which once again invert the scene beam. The lens system 33 is so positioned that the beam bender 32 and the photographic plate 25 are at conjugate positions with respect to lens system 33. The lens system 33 may be made relatively large so as to illuminate a relatively large area between the lens 33 and the photographic plate 25 for recording a hologram of an object in transmission. Also the photographic plate 25 may have a substantial size such as 4 x 5 inches. The field of view is determined by the diameter of the focusing lens system 33 and the size of the hologram. The lens 33 may be readily replaced by another lens system because the beam bender 32 and photographic plate 35 are at conjugate positions and the reference beam is parallel.

Preferably the scene beam and reference beam intersect each other at the photographic plate 25 at an angle of approximately 45°. This angle may be chosen as a reasonable compromise so that the reference beam is not blocked by an object placed between the lens 33 and the photographic plate 25. Also photographic emulsions of higher speed and lesser resolution could be used (one example or type being emulsion 10E75 manufactured by Agfa Gevaert).

It will be understood that the interference of the scene beam and reference beam at the plane of the plate 25 sets up a stationary standing wave pattern caused by interference of the two light beams. The photographic plate records a portion of this interference pattern.

In order to minimize distortion of the recorded interference pattern, for example, due to shrinkage of the emulsion, when the photographic plate, is developed, the plate 25 is preferably canted. The angle is such that the emulsion is perpendicular to the direction of the loci of the constructive or destructive interference. In other words, the plane through which the photosensitive material 25 extends is such that a line perpendicular to the plane bisects the angle between the reference and the scene beam. Accordingly, assuming that the angle between the reference and the scene beam is 45°, the photographic plate is canted at an angle of approximately 67.5°, with respect to the axis of the focusing lens 33.

Due to the fact that the reference beam 20 is collimated and parallel, there is no uncertainty in reproducing the hologram.

The angle of view of the scene which is reconstructed from a hologram made by the apparatus of FIG. 1 is determined by D, which is the diameter or aperture of the focusing lens 33, the projected width W of the hologram and the distance 2F between the hologram 25 and the lens 33, where F is the focal length of the lens system 33. Accordingly the angular field of view $\alpha$ may be obtained from the following formula.

$$\tan \alpha \simeq \pm \frac{W+D}{4F} \quad (1)$$

A unit which has been built had the following constants:

$$D = 14'', W = 4'', 2F = 40''$$

and consequently $$\tan \alpha \simeq \pm \frac{18}{80}$$

or $$\alpha \simeq \pm 12.5°$$

Since the beam bender 32 is conjugate with the photographic plate 25, the beam bender should optimally and preferably also be canted in the opposite direction and at the same angle as is the photographic plate 25.

A beam bender, such as shown schematically at 32 in FIG. 1 is illustrated by way of example in FIG. 2 to which reference is now made. The beam bender consists of two transparent plates or sheets 37 and 38. Each of the sheets 37 and 38 has a flat outer surface 40. The opposed surfaces 41 are provided with a set of parallel grooves 42 which are triangular in cross-section as shown. The grooves may, for example, be made by ruling the two sheets 37 and 38 or by milling them with a suitably shaped fly cutter. The sheets 37 and 38 may be made of a clear acrylic plastic. Such a plastic is sold in the trade under the name Plexiglass by Rohm and Haas Co. As clearly shown in FIG. 2 the grooves 42 of the adjacent sheets 37 and 38 face each other and form in essence a set of adjacent prisms.

Assuming that the index of refraction of the sheets 37 and 38 is 1.5, and further assuming that the incoming beam as shown at 43, forms an angle of 45° as shown, with an outgoing beam 44, the angle between the flat surface 40 and a surface 45 of the triangular grooves 42, should be of the order 40⅜° as shown.

It has been found that if the milled plastic sheets 37, 38 are not perfect, or if the milled grooves 42 show imperfections, the effects of such imperfections can be removed by spraying the cuts with a suitable transparent lacquer. Such a lacquer is sold in the trade under the name of Krylon Workable Fixative by Borden Chemical Company in New York.

Preferably the beam bender 32 is followed by a light diffuser consisting of a transparent sheet 47, having opposed surfaces 48 and 50, which are treated to operate as a diffuser, such for example, as ground glass. Preferably as indicated both surfaces 48 and 50 are made to be diffusing.

In order to adjust the two light beams together, that is the reference beam 20 and the scene beam 21, the mirror 17 may be adjusted. On the other hand, by adjusting the mirror 23 it is possible to adjust only the reference beam 20. In any case the adjustment should be such that the two beams register at the photographic plate 25. It will, of course, be understood that this adjustment is made once and for all and need not be disturbed once it has been made.

The spatial coherence matching which is achieved by the holographic apparatus of the invention shown in FIG. 1, may be explained as follows. Considering, for example, three rays or beams 52, 53 and 54 reflected by the mirror 17. These three beams are split up into the three reference beams 52a, 53a and 54a. On the other hand, the corresponding scene beams are 52b, 53b and 54b. The scene beam 52b has been shown emerging from the combination beam bender and diffuser 32 and eventually is focused by the lens system 33 at the point 55 on the hologram 25. The corresponding reference beam 52a also arrives at the same point 55. It will be apparent that other portions of the reference beam, such as 53a and a corresponding scene beam portion 53b will be focused similarly at a point 56, etc. Accordingly it will be evident that the two beams, that is the reference and the scene beam, are in spatial coherence due to the particular optical system of the invention where the scene beam is inverted once by the roof reflector 28, 30 and once again by the inverting and focusing lens system 33.

Referring now to FIG. 3 there is illustrated a practical embodiment of the holographic apparatus of the present invention which has been built and tested. The embodiment of FIG. 3 includes the same optical components as does that of FIG. 1 and they have been designated by the same reference numerals. As shown in FIG. 3 the laser 10 may be enclosed in a suitable closed cylindrical housing 55 having a closed rear wall 56 and a front wall 56 with an aperture or window for the light beam schematically shown at 11 to emerge from the housing 55. A portion of the beam expanding and collimating lens system may be enclosed in a suitable conical housing 58 which houses a pair of diverging lenses 14. The focusing lens 15, the reflecting mirror 17, the beam splitter 18, the mirror 27, the roof reflector 28 and the beam bender and diffusers 32 are enclosed in a suitable housing 60 which may have a substantially rectangular cross-section and which is shaped to contain the necessary optical components. The housing 60 has an upper portion 61 enclosing essentially the focusing lens 16, the reflecting mirror 17 and the beam splitter 18. The lower housing portion 62 protects the reflecting mirror 27, the roof reflector 28, and the beam bender 32.

The reference beam 20 may be enclosed in a suitable pipe or cylinder 63 which, of course, extends parallel to the laser housing 55. There is also provided a depending housing portion 64, including a horizontal platform or support 65. The depending housing portion 64 houses the reflecting mirrors 23 and 24 and the photographic plate 25. Finally the focusing lens system 33 may be disposed in a depending disc-shaped housing 66, including apertures 67 at opposite sides thereof for permitting the scene beam to pass therethrough.

It should be noted that the structure illustrated in FIG. 3 may be supported by a braced framework, which may, for example, be attached to the pipe 63 for the reference beam for permitting the holographic apparatus to be moved from place to place without requiring adjustment.

It is generally desirable that the intensity of the reference beam be no greater than that of the scene beam where it meets the photographic plate 25. Accordingly it may be desired to attenuate the reference beam. This may be achieved by an attenuator 68 disposed in the path of the reference beam 20 ahead of the mirror 23. Another attenuator 70 may be disposed in front of the mirror 23.

A suitable shutter 71 may be disposed at the entrance of the depending portion 64. By closing the shutter 71 the scene beam and any stray light are prevented from reaching the hologram 25. This makes it possible to illuminate a previously recorded hologram 25 with the reference beam without disturbance by a scene beam.

Furthermore, stray light which may enter the portion between the focusing lens system 33 and the shutter 71 may be minimized by the provision of an optical filter 72 which may be disposed behind and adjacent to shutter 71. This is preferably an optical filter which will pass only the wavelength of the laser light and hence minimize stray light that may enter the system. Also a light polarizer 73 may be disposed in the path of the scene beam between the optical filter 72 and the hologram 25. This may be used to minimize undesirable light by permitting only light to pass which is polarized in a predetermined direction.

Another shutter 74 may be disposed ahead of the photographic plate 25. This shutter may be opened whenever it is desired to take a hologram.

It will be noted that the entire holographic system is enclosed by the housing portions 55, 58, 60, 63, 64 and 66. Accordingly all the optical elements are substantially sealed and the apparatus is able to withstand corrosive vapors or chemicals. The apparatus illustrated in FIG. 3 has been utilized for taking holograms of the exhaust of liquid fuel rocket nozzles. It has also been used for taking double exposed holographic interferograms of phenomena occurring in wind tunnels.

On the platform 65 there may be mounted a conventional camera 75. This may be utilized for photographing a reconstructed hologram. In other words, assuming that the hologram 25 has originally been recorded it may then be illuminated by the reference beam 20, the shutter 72 being closed. The camera 75 then permits to record such a reconstructed hologram or portions thereof. The camera may also be used as an illuminator to project a real or virtual image back into the space between the shutter 71 and the focusing lens system 33. This makes it possible to compare a previously taken reconstructed hologram with another object or phenomenon to be recorded or observed. The real images which may be projected from the hologram 25 may also be examined with high magnification, such as by means of a microscope.

There has thus been disclosed a holographic apparatus which permits the recording of holograms of relatively large objects. The recording is in transmission. The arrangement is such that the apparatus is relatively compact and may readily be moved from place to place. The entire optical system may be enclosed by a suitable housing to render the apparatus unaffected by corrosive vapors or the like. It may be used for taking holograms of a liquid-fuel rocket-nozzle exhaust or phenomena in a wind tunnel. The hologram is oriented perpendicular to the interference pattern. This minimizes distortion which may occur during the development of the photographic plate. The angle of view may be relatively large and is determined by the diameter of the focusing lens. Different lenses may readily be inserted because the focusing lens merely determines the conjugate positions of the beam bender and the hologram. All other optical components are unaffected by a change of the focusing lens.

What is claimed is:

1. A holographic apparatus for recording holograms in transmission of a relatively large object, said apparatus providing both temporal and coherence matching and comprising:
    (a) a laser for developing a substantially monochromatic first light beam, said first light beam defining a first axis and having a relatively limited coherence length;
    (b) a first lens system disposed in the path of said first light beam for expanding and collimating said first light beam;
    (c) a first mirror oriented to redirect said light beam along a path that forms an acute angle with respect to said first axis;
    (d) a beam splitter, said first mirror and said beam splitter being sequentially disposed in the path of said first expanded light beam, said beam splitter reflecting a portion of said first light beam in a direction substantially parallel to that of said first axis to provide a reference beam defining a second axis, and said beam splitter passing another portion of said first light beam therethrough to provide a scene beam;
    (e) a planar photosensitive material disposed in a predetermined plane for recording a hologram;
    (f) a second and a third mirror, each being sequentially disposed in the path of said reference beam for directing said reference beam onto said photosensitive material and having reflective surfaces which face each other, said beam splitter and said second mirror being so spaced that said reference beam extends substantially along the length of said laser;
    (g) a fourth mirror in the path of the scene beam oriented so as to redirect said scene beam along a path substantially parallel to and substantially in the extends substantially along the length of said laser;
    (h) a roof reflector oriented so as to receive the scene beam from said fourth mirror and redirect said scene beam along a path that crosses the path of said scene beam before it impinges on said fourth mirror, said roof reflector inverting said scene beam;
    (i) a beam bender and a light diffuser disposed in the path of said scene beam reflected from said roof reflector, said beam bender being oriented so as to redirect said scene beam along a third axis substantially parallel to said first and second axes; and
    (j) a second lens system disposed in the path of said scene beam between said light diffuser and said photosensitive material for inverting and focusing said scene beam, said second lens system being disposed substantially midway between said light diffuser and said photosensitive material and having such a focal length as to focus said light diffuser on said photosensitive material, said light diffuser and said photosensitive material being disposed along said third axis, and said scene beam between said light diffuser and said photosensitive material having a length substantially coextensive with that of said reference beam between said beam splitter and said second mirror, said light diffuser and said photosensitive material being canted with respect to said third axis to form equal angles opposite in sign, said second and third mirrors, and said fourth mirror and roof reflector being so disposed that said scene beam impinges on said beam bender at an angle equal to and opposite in sign to that of said reference beam impinging on said photosensitive material.

2. A holographic apparatus as defined in claim 1 wherein said second, third and fourth mirrors and said roof reflector are so arranged that a line perpendicular to the plane through which said photosensitive material extends bisects the angle between said reference beam and said scene beam at said photosensitive material.

3. A holographic apparatus as defined in claim 2 wherein said second, third and fourth mirrors and said roof reflector are so arranged that said reference and scene beams intersect each other at said photosensitive material at an angle of approximately 45°, and said beam bender bends said scene beam through substantially the same angle.

4. A holographic apparatus as defined in claim 2 wherein said plane through said photosensitive material forms an angle of approximately 67.5° with respect to said third axis.

5. A holographic apparatus as defined in claim 3 wherein said beam bender consists of two opposed transparent elements, each having an outer substantially plane surface and each being provided with triangularly shaped grooves on opposed adjacent surfaces for bending the light of said scene beam without inverting it.

6. A holographic apparatus as defined in claim 5 wherein said light diffuser is disposed contiguous to one of said transparent elements.

7. A holographic apparatus as defined in claim 1 wherein a camera is disposed adjacent said photosensitive material for taking pictures of a hologram recorded on said photosensitive material.

8. A holographic apparatus as defined in claim 5 wherein said transparent elements consist each of a clear acrylic sheet having an index of refraction on the order of 1.5, and wherein one surface of each of said grooves makes an angle of approximately 40⅜° with the associated plane outer surface of each of said elements for bending said scene beam through an angle of approximately 45°.

References Cited

Brooks et al., IEEE Journal of Quantum Electronics, vol. QE-2, No. 8, August 1966, pp. 275–279.

DAVID SCHONBERG, Primary Examiner

R. J. STERN, Assistant Examiner

UNITED STATES PATENT OFFICE
CERTIFICATE OF CORRECTION

Patent No. 3,529,883  Dated September 22, 1970

Inventor(s) Lee O. Heflinger and Ralph F. Wuerker

It is certified that error appears in the above-identified patent and that said Letters Patent are hereby corrected as shown below:

Column 6, line 48    delete "ouly" and substitute therefor --only--;

Column 7, line 61    delete "extends substantially along the length of said laser;" and substitute therefor --same direction as the beam developed by said laser;--.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents